US006994879B2

(12) United States Patent
Cirigliano et al.

(10) Patent No.: US 6,994,879 B2
(45) Date of Patent: Feb. 7, 2006

(54) METHOD FOR PREVENTING PASSING OFF OF A BREWED BEVERAGE

(75) Inventors: Michael Charles Cirigliano, Cresskill, NJ (US); Mauro Dominick Mordini, Parsippany, NJ (US)

(73) Assignee: Unilever Bestfoods, North America, a division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 10/723,378

(22) Filed: Nov. 26, 2003

(65) Prior Publication Data

US 2004/0103792 A1   Jun. 3, 2004

Related U.S. Application Data

(63) Continuation of application No. 10/178,972, filed on Jun. 25, 2002, now Pat. No. 6,786,136.

(51) Int. Cl.
A23F 5/24   (2006.01)
A23F 3/16   (2006.01)
A23L 1/28   (2006.01)

(52) U.S. Cl. .................. 426/433; 426/435; 426/82
(58) Field of Classification Search ................ 426/433, 426/435, 82
See application file for complete search history.

(56) References Cited

U.S. PATENT DOCUMENTS

| 3,445,237 | A | * | 5/1969 | Gidge | .......................... 426/77 |
| 3,450,024 | A | * | 6/1969 | Martin | .......................... 99/295 |
| 3,861,285 | A | * | 1/1975 | Martin | .......................... 99/295 |
| 4,550,024 | A | | 10/1985 | le Granse | |
| 5,325,765 | A | | 7/1994 | Sylvan et al. | |
| 5,327,815 | A | * | 7/1994 | Fond et al. | .................... 99/295 |
| 5,339,596 | A | * | 8/1994 | Cohen | ....................... 53/136.3 |
| 5,347,916 | A | | 9/1994 | Fond et al. | |
| 5,663,026 | A | | 9/1997 | Kasuya et al. | |
| 5,717,307 | A | * | 2/1998 | Barkat et al. | ............. 340/636.1 |
| 5,927,179 | A | | 7/1999 | Mordini et al. | |
| 6,182,554 | B1 | * | 2/2001 | Beaulieu et al. | .......... 99/289 R |
| 6,305,268 | B1 | | 10/2001 | Schamberg et al. | |
| 6,393,966 | B1 | | 5/2002 | Hart et al. | |
| 6,649,045 | B2 | * | 11/2003 | Tanner et al. | .................. 210/85 |
| 6,655,260 | B2 | * | 12/2003 | Lazaris et al. | ................ 99/295 |
| 6,698,333 | B2 | * | 3/2004 | Halliday et al. | .............. 99/295 |
| 2001/0052294 | A1 | * | 12/2001 | Schmed | ....................... 99/295 |
| 2001/0053399 | A1 | | 12/2001 | Herod | |
| 2002/0002908 | A1 | | 1/2002 | Clean et al. | |
| 2002/0023543 | A1 | * | 2/2002 | Schmed | ....................... 99/295 |
| 2002/0048621 | A1 | * | 4/2002 | Boyd et al. | .................... 426/77 |

FOREIGN PATENT DOCUMENTS

DE   3632686   3/1988
EP   0 776 166 B1   4/2001

OTHER PUBLICATIONS

International Search Report claiming priority of PCT/EP 03/05470 dated Sep. 1, 2003.

(Continued)

*Primary Examiner*—Anthony Weier
(74) *Attorney, Agent, or Firm*—Edward A. Squillante, Jr.

(57) ABSTRACT

This invention is directed to an apparatus for brewing a beverage. The apparatus has a brew funnel, a key and an elevation device so that only one brand of beverage can be brewed to thereby prevent harm and confusion to consumers.

6 Claims, 6 Drawing Sheets

OTHER PUBLICATIONS

Related co-pending U.S. Appl. No. 10/142,454; filed May 10, 2002; "Apparatus for Brewing a Beverage" Mordini et al.

Related co-pending U.S. Appl. No.: 10/178,972; filed Jun. 25, 2002; "Apparatus for Brewing a Beverage" Cirigliano et al.

* cited by examiner

METHOD FOR PREVENTING PASSING OFF OF A BREWED BEVERAGE

This is a continuation of Ser. No. 10/178,972, filed Jun. 25, 2002, now U.S. Pat. No. 6,785,136.

FIELD OF THE INVENTION

The present invention is directed to an apparatus for preventing the passing off of a brewed beverage. More particularly, the invention is directed to a beverage brewing apparatus wherein the apparatus has a key means to accept one brand of a filter pack with beverage precursor packed therein.

BACKGROUND OF THE INVENTION

Traditionally, unfair competition laws protect the first user of a name, brand or symbol in connection with the sale of goods or services against a competitor whose subsequent use of such a name, brand or symbol confuses consumers as to the source and/or quality of the goods or services. Unfair competition laws also protect consumers from the tort of passing off which occurs when, for example, a consumer asks to buy a specific product but is actually, without knowing, sold another product, typically of inferior quality.

In the beverage brewing industry, suppliers of tea leaf, for example, often supply to food establishments (i.e., in addition to the tea leaf) tea brewing apparatuses, and such apparatuses typically display the name of the supplier of the tea leaf or the tea leaf brand. It may be desirable, for instance, for superior food companies, like Unilever Bestfoods, to supply tea leaf (i.e., under the Lipton Tea Brand) to food establishments, along with a tea brewing apparatus marked with the famous Lipton Tea Brand logo. The marking on the beverage brewing apparatus provides notice to the consumer or end user that a specific product, of known quality, aroma and taste, is being brewed and dispensed from the tea brewing apparatus.

Unfortunately, however, many food establishments, subsequent to obtaining a beverage brewing apparatus, do not always brew a beverage, like tea, with a brand of beverage precursor that is supplied by (e.g., matches) the company having its name or brand displayed on the beverage brewing apparatus. Such a practice often confuses a consumer such that the consumer typically gets a brewed beverage of a quality that is less than the quality of the beverage expected. Moreover, the practice of brewing a beverage in such a matter, almost always, results in the consumer getting a beverage having an unexpected aroma and taste.

It is of increasing interest to develop a beverage brewing apparatus that is suitable to prevent the passing off of a beverage. This invention, therefore, is directed to a beverage brewing apparatus wherein the apparatus has a key means to accept one brand of a filter pack with beverage precursor packed therein.

ADDITIONAL INFORMATION

Efforts have been disclosed for brewing beverages. In U.S. patent application Ser. No. 2001/0053399 A1, a coffee filter pack apparatus is described.

Other efforts have been disclosed for brewing beverages. In European Patent Specification EP 0 776 166 B1, an infusion beverage product having co-agglomerated creamer and sweetener is described.

Still other efforts have been disclosed for making a brewed beverage. In U.S. Pat. No. 6,393,966, a beverage server and brewer that can automatically initiate a brewing cycle is described.

None of the additional information above describes a brewing apparatus wherein the apparatus has a key means to accept one brand of a filter pack with beverage precursor packed therein.

SUMMARY OF THE INVENTION

In a first aspect, the present invention is directed to a brew funnel comprising:

(a) a mouth suitable for receiving a beverage precursor within a filter pack;
(b) a floor, opposite the mouth, the floor comprising an aperture for beverage drainage;
(c) a surrounding wall having a top and bottom portion, the bottom portion being connected to the floor and the top portion forming the mouth of the brew funnel; and
(d) an elevation device placed and supported therein wherein the brew funnel further comprises a key means comprising a portion above the elevation device and attached to the floor or surrounding wall or both, or a key means attached to or protruding from a top portion of the elevation device thereby enabling the brew funnel to accept one brand of a filter pack with beverage precursor packed therein.

In a second aspect, the present invention is directed to a beverage brewing apparatus comprising the brew funnel of the first aspect of this invention.

In a third aspect, the present invention is directed to a method for making or brewing a beverage with the brew funnel of the first aspect of this invention.

Elevation device, as used herein, is defined to mean a device comprising a flat platform with a top and bottom portion; having the ability to be supported within a brew funnel, when elevated from and substantially parallel to the floor of the brew funnel; and having the ability to hold up and support a filter pack, the platform being porous to a liquid (e.g., a platform with at least two holes or perforations but preferably a plurality of holes or perforations).

Beverage precursor, as used herein, is defined to mean a material that can be contacted with water to produce a beverage, such a beverage precursor can be ground coffee or tea leaf.

Beverage, as used herein, is defined to mean a liquid that may be consumed by a human and made with a beverage precursor.

Coffee is defined to mean a beverage derived from a coffee bean, including ground coffee.

Tea, as used herein, is meant to include tea derived from *Camillia sinensis*, as well as herbal teas.

Filter pack is defined to mean a package having an outer material, like a filter paper material, that can be used to package a beverage precursor, whereby such a filter pack can expand or swell so that the beverage precursor is sufficiently contacted with water to brew beverage.

Brand is defined to mean a specific type of product or a series of products, with or without the same name, coming from a single source.

Key means is defined to mean a tangible item having a shape or configuration that acts like a key complementary to a form or contour of a filter pack with beverage precursor packed therein.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
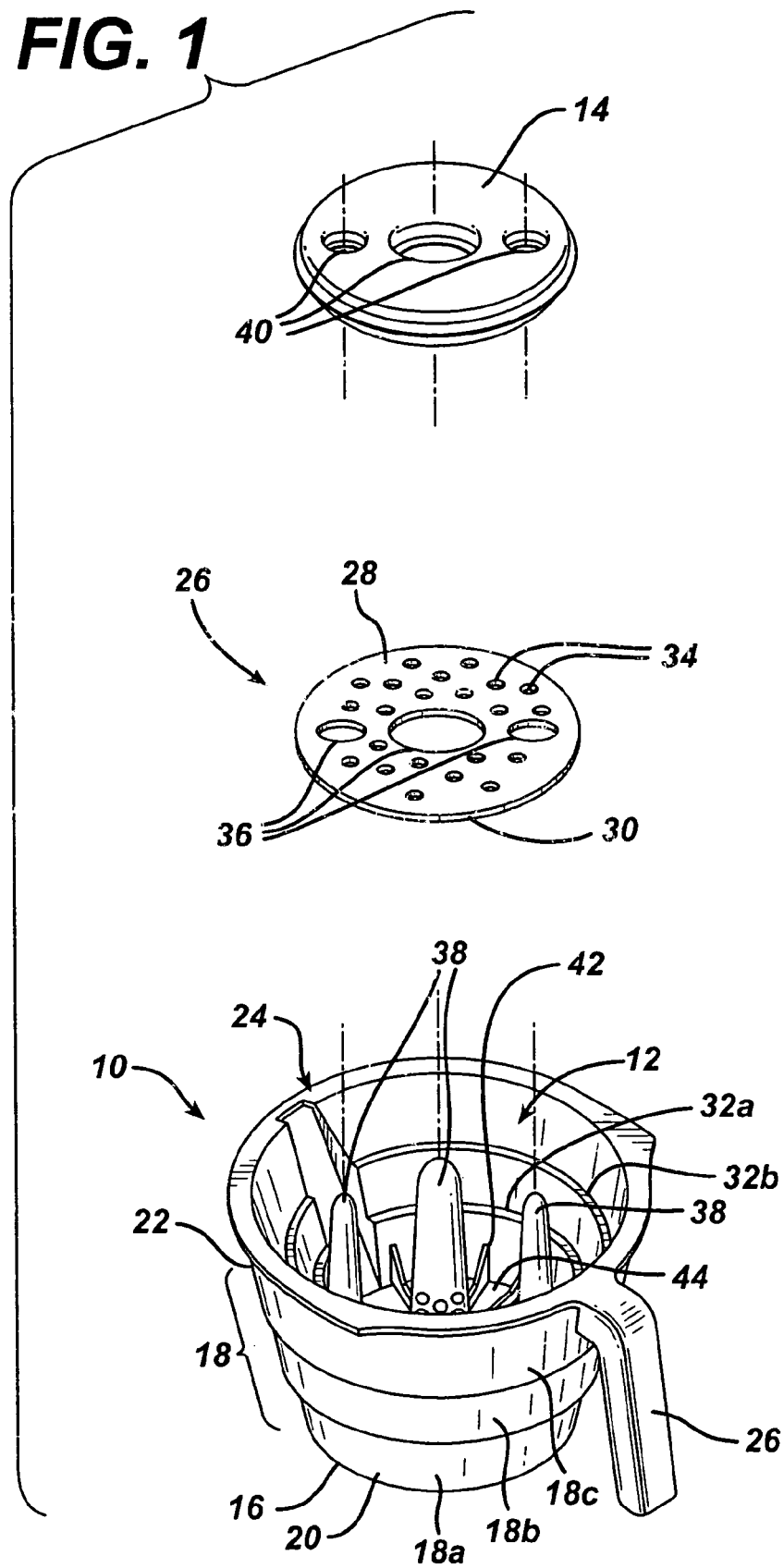
FIG. 1 depicts a brew funnel with a key means attached to its floor, an elevation device, and a filter pack with a beverage precursor packed therein.

There is no limitation with respect to the brew funnel that may be used in this invention other than that the brew funnel is one that may be used in an apparatus that can brew beverage, internally can support an elevation device and optionally can have a key means molded or attached to its floor and/or surrounding wall. Typically, such a brew funnel is made of polymeric material like a polycarbonate, polyester, polyamide, polyphenylene ether, blend thereof, copolymer thereof or the like.

A brew funnel that may be used in the invention herein includes those sold with an apparatus that can brew beverage such as those made commercially available (without the elevation device and without the key means of this invention) from suppliers like Bunn-O-Matic, Curtis, Cecilware, Hamilton Beach-Proctor Silex, Inc., Newco, Food Equipment Technologies, Inc. and Black and Decker. The most preferred brew funnels are the superior funnels obtainable with the tea brewing apparatuses made commercially available (without the elevation device and without the key means of this invention) by Unilever Bestfoods and sold under the Lipton Tea Brand. It is noted that when conventional and commercially available brew funnels are employed, the elevation device having the key means attached to or protruding from its top portion (i.e., the top portion of the platform) is desired.

Non-commercially available brew-funnels may be employed in this invention and these brew funnels comprise the addition of key means, for example, molded or attached therein (e.g., by use of an adhesive or by altering a conventional brew funnel mold).

Regarding the brew funnel employable in this invention, such a funnel may be used with an apparatus that brews hot or cold beverage. Therefore, the brew funnel may be used in apparatuses that brew beverage with water at a temperature from about 15° C. to about 99° C., with water at a temperature from about 15° C. to about 65° C. when, for example, cold brewed tea (e.g., iced tea) is preferred and from about 80° C. to about 99° C. when, for example, hot brewed tea is preferred.

As to the elevation device, such a device comprises a flat porous platform which is porous to a liquid, and the elevation device can fit within and be supported by the brew funnel. The elevation device is suitable to hold up and support beverage precursor within a filter pack to efficiently brew beverage. It is particularly noted that it is within the scope of this invention to fit existing and conventional brew funnels with the elevation device (comprising a key means) of this invention. This is desired when the floor and surrounding wall of the brew funnel are not equipped with a key means. It is noted that the brew funnel of this invention should have at least one key means, and the key means can be attached to the floor and/or surrounding wall of the brew funnel, or the elevation device.

There generally is no limitation with respect to the beverage precursor which may be used in this invention, other than that the beverage precursor may be used to brew beverage with hot or cold water. In an especially preferred embodiment, however, the beverage brewed within the apparatus of this invention is tea brewed from superior tea leaf sold by Unilever Bestfoods under the Lipton Brand.

Turning to the Figures, FIG. 1 depicts an illustrative brew funnel 10 (without elevation device and filter pack), comprising a mouth 12 suitable for receiving a filter pack 14 with beverage precursor packed therein. The brew funnel 10, also comprises a floor 16 having a diameter that is often at least about 5%, and preferably, at east about 10%, and most preferably, at least about 20% less than the diameter of the mouth 12. The brew funnel 10 further comprises a surrounding wall 18 optionally comprising a plurality of walls (e.g., 18a, 18b and 18c that decrease in diameter from top to bottom). The surrounding wall 18 has a bottom portion 20 connected to the floor 16 and a top portion 22 forming the mouth 12 of the brew funnel 10. Pour spout 24 is located on the anterior portion of the brew funnel 10 so that liquid (not shown) may be removed from the brew funnel after brewing beverage or washing. Handle 26, generally opposite to pour spout 24, is provided to maneuver brew funnel 10, siphon arrangement (shown in FIG. 3) is provided and operatively associated with a substantially central aperture (shown in FIG. 2) in the floor 16 of the brew funnel 10. The siphon arrangement (shown in FIG. 2) initiates capillary action so that the beverage brewed may exit brew funnel 10 near the central aperture (shown in FIG. 2), preferably at a rate that allows for pasteurization. Brew funnel lip 24 allows for the mounting of the brew funnel 10 onto guides of the brewing apparatus depicted in FIG. 5.

Illustrative elevation device 26 may be metal, plastic, or the like and fits within brew funnel 10. Elevation device 26 comprises a top portion (on the flat platform) 28 with outer ridge 30 to rest on inner step 32a or 32b of brew funnel 10, a plurality of perforations 34 and a receiving means 36, illustrated as three openings or holes, preferably larger than perforations 34, for receiving (e.g., interlocking) key means 38 (attached to floor 16 and illustrated as finger-like) within brew funnel 10 so that elevation device 26 may be placed within brew funnel 10 to rest on inner step 32a or 32b. Filter pack 14 has filter receiving means 40, illustrated as three openings or holes, preferably larger than perforations 34, for receiving key means 38 within the brew funnel. The dimensions of receiving means 36 and filter receiving means 40 are substantially identically and their positioning is substantially in alignment so that elevation device 26 and filter pack 14, respectively, may be placed over (e.g., like a lock & key) key means 38 within brew funnel 10, such that a portion of the key means 38 is above the elevation device 26 and within (preferably beyond) the filter receiving means 40 of filter pack 14.

In a preferred embodiment, elevation device 26 has a diameter that is often at least about 5%, and preferably at least about 10%, and most preferably, at least about 20% less than the diameter of brew funnel mouth 12. In another preferred embodiment, filter pack 14 (when dry) has a diameter that is substantially identical (i.e., ±5.0%) to the diameter of the elevational device 26, and the brew funnel 10 has baffles 42 forming channels 44 to guide beverage not shown towards the aperture (shown in FIG. 2). In yet another preferred embodiment, no more than about 50%, and most preferably, no more than about 35% of the volume of the brew funnel 10 is below elevation device 26 when elevation device 26 is placed within the brew funnel 10. In an especially preferred embodiment, less than about 25% of the total length of the siphon arrangement (shown in FIG. 2) within the brew funnel 10 protrudes through (i.e., beyond) elevation device 26 when the elevation device 26 is within the brew funnel 10 and outer ridge 30 is resting on inner step 32a or 32b. It is noted that such a siphon arrangement (shown in FIG. 2) is often-desired and can be present under and within, for example, the central portion (i.e., finger) of key means 38 as is the case illustrated in FIG. 1.

Figure 2:
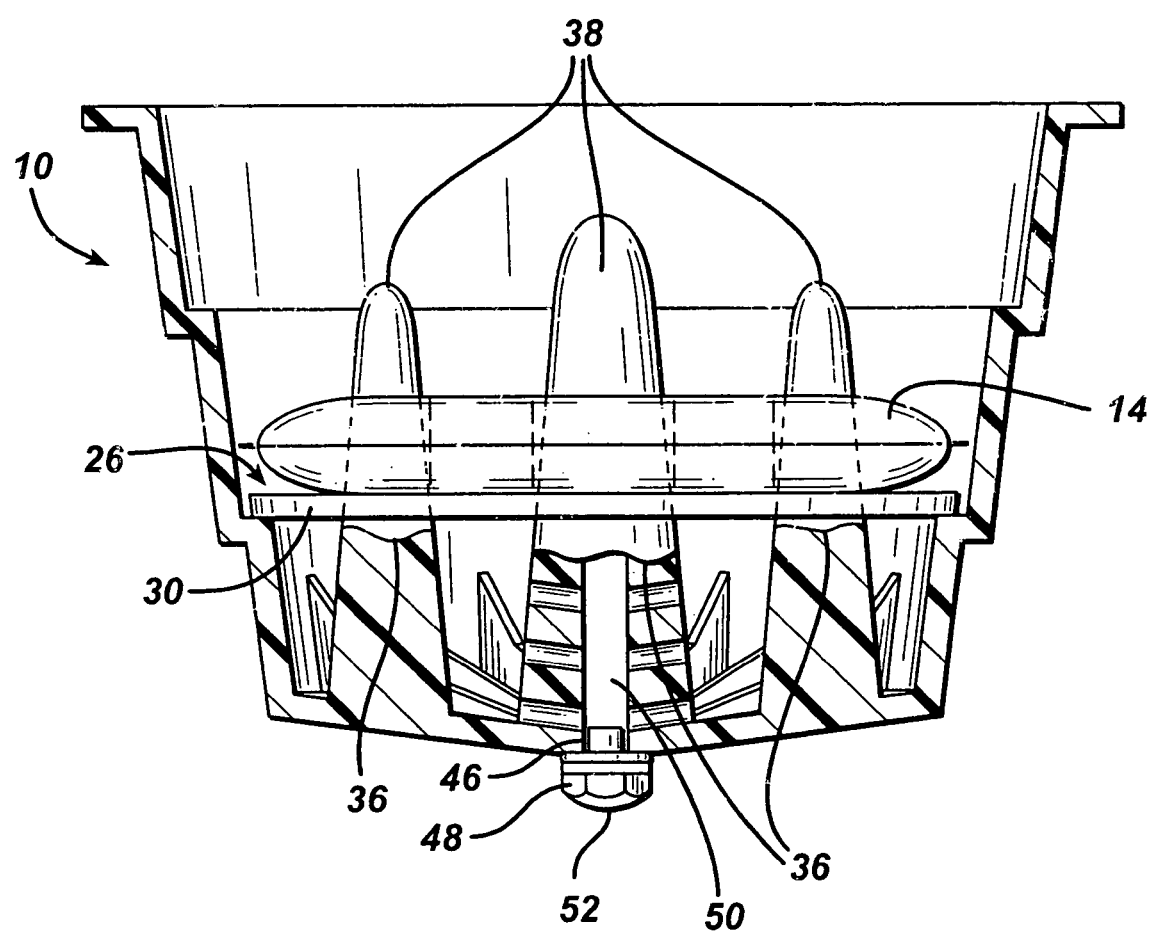
FIG. 2 depicts a cross-section of the brew funnel assembled with the elevation device and filter pack with beverage precursor packed therein.

FIG. 2 depicts brew funnel 10 (cross-section) with elevation device 26 therein. Elevation device 26 rests within brew funnel 10 by placing outer ridge 30 on (in this illustration) inner step 32a whereby key means 38 extends through receiving means 36. Filter pack with beverage precursor therein 14 is shown resting within brew funnel 10 and on elevation device 26 so that key means 38 can extend through receiving means 36 and filter receiving means 40, and beverage can be brewed (either hot or cold). Aperture 46 is shown with bottom portion 48 (which is often threaded to mount siphon arrangement 50 to brew funnel 10) of siphon arrangement 50 extending therefrom so that beverage (not shown) and ready for consumption may drain from the exit pore 52 of the siphon arrangement. A more detailed description of how the siphon arrangement 50 operates may be found in U.S. Pat. No. 5,927,179, the disclosure of which in incorporated herein by reference.

Figure 3:
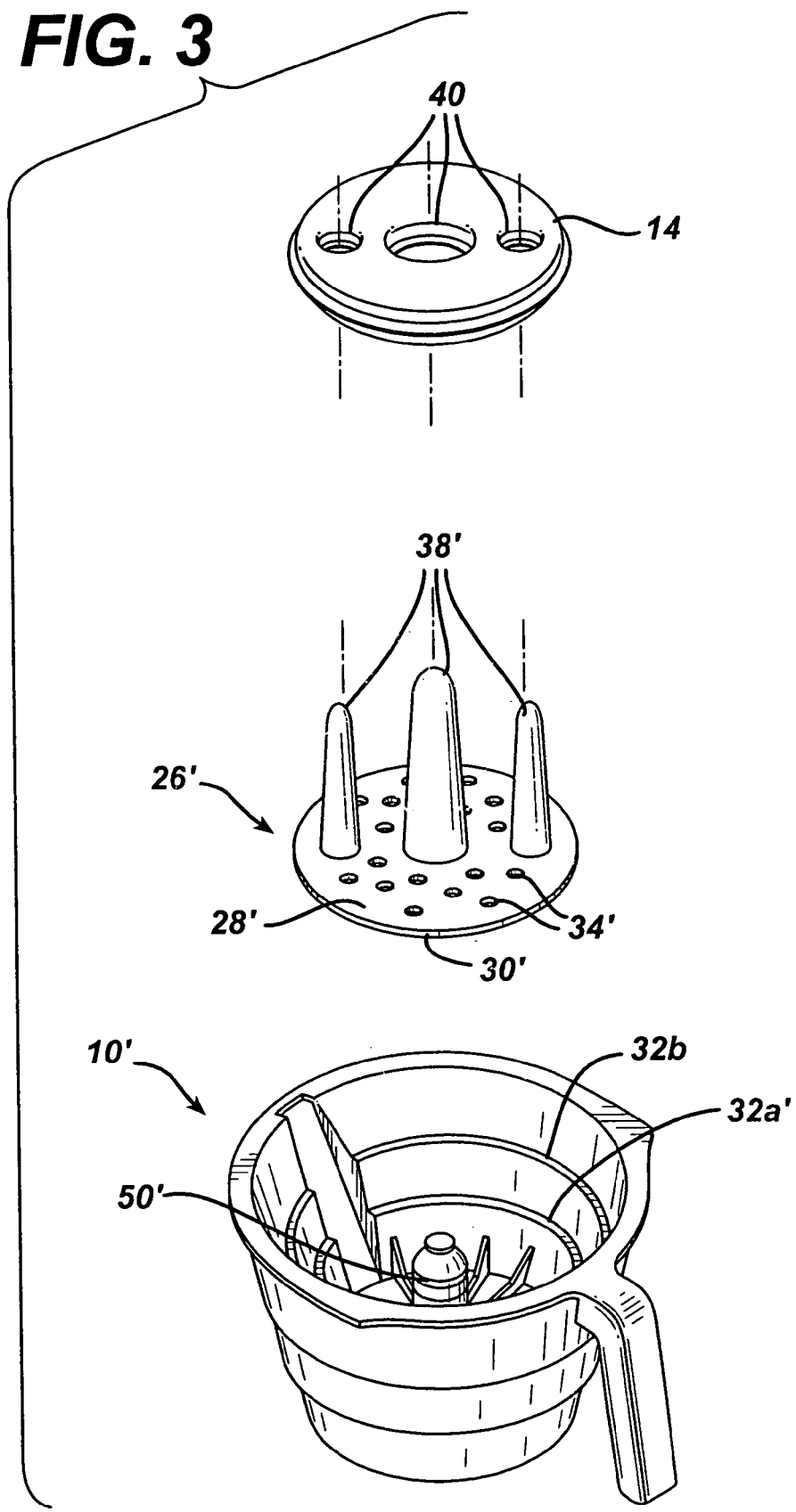
FIG. 3 depicts a brew funnel, an elevation device having an upper portion with a key means attached thereto, and a filter pack with a beverage precursor packed therein.

FIG. 3 shows brew funnel 10' and illustrative elevation device 26' having top portion 28' with a plurality of perforations 34' and a key means 38' (illustrated as finger-like) for receiving filter pack 14 by inserting key means 38' through filter receiving means 40. Elevation device 26' may be placed and supported (within brew funnel 10) by resting outer ridge 30' on either inner step 32a' or 32b', whereby siphon arrangement 50' (in this illustration) is not entirely within a portion of key means 38'. When employing elevation device 26' having a key means 38', it is not necessary to employ brew funnel 10 having a key means 38'. Therefore, brew funnel 10' may be used in lieu of brew funnel 10 when illustrative elevation device 26' is used in lieu of elevation device 26.

Figure 4A:
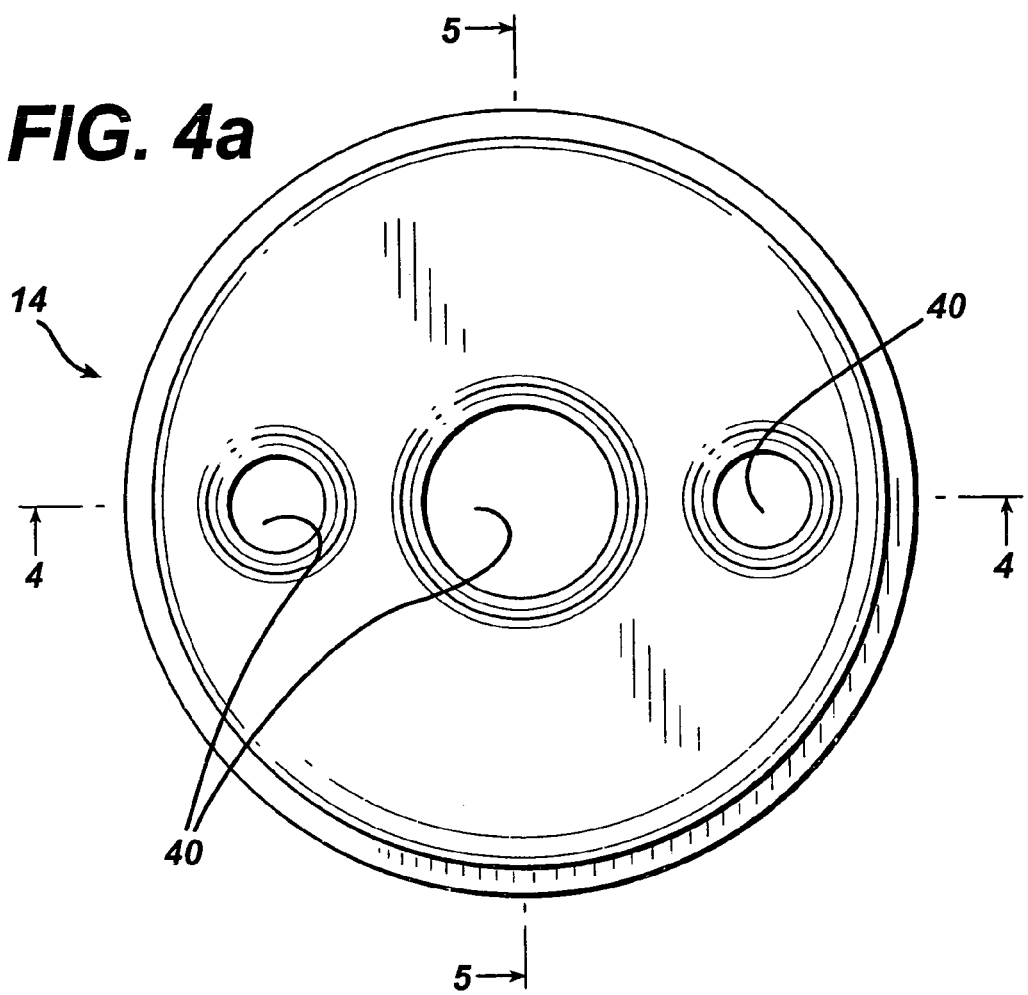
FIGS. 4a–c depict various exposures of the filter pack.
Figure 4B:
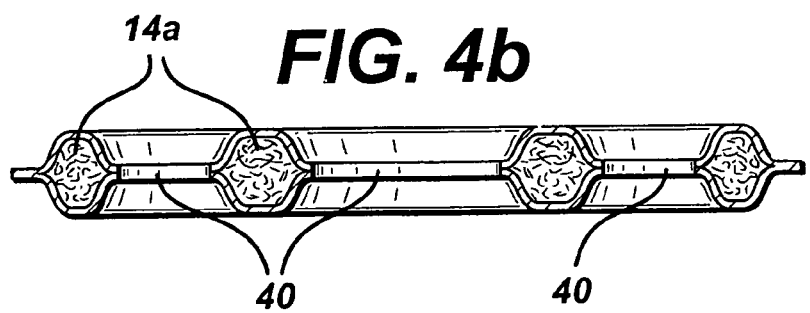
Figure 4C:
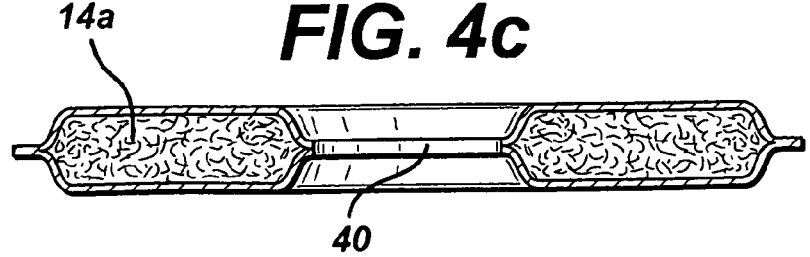

FIG. 4a shows a top plan view of filter pack 14 having illustrative filter pack receiving means 40. FIG. 4b is a horizontal cross-section of the filter pack 14 shown in FIG. 4a with beverage precursor 14a packed therein, and FIG. 4c is a vertical cross-section of the filter pack 14 shown in FIG. 4a with beverage precursor 14a packed therein.

Figure 5:
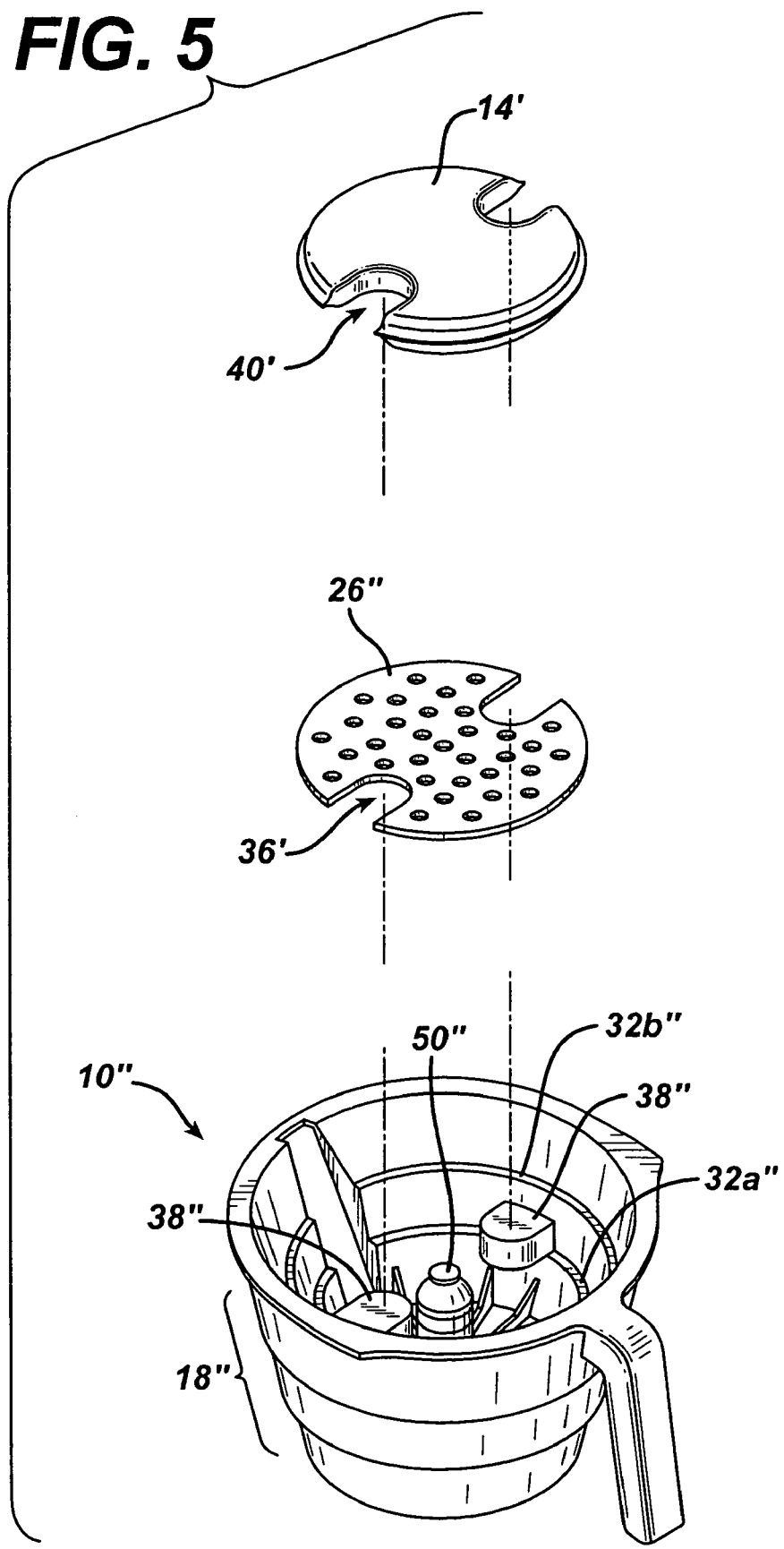
FIG. 5 depicts a brew funnel with a key means attached to its surrounding wall, an elevation device and a filter pack with beverage precursor packed therein.

FIG. 5 shows a brew funnel 10" comprising siphon arrangement 50", and mounted to the inside of surrounding wall 18" in lieu of floor 16 as shown in brew funnel 10. Elevation device 26" is shown with receiving means 36' in lieu of receiving means 36 whereby elevation device 26" may rest and be supported by inner step 32a" or 32b" when receiving means 36' is aligned with and placed over key means 38" such that at least a portion of the key means 38" is above elevation device 26" when the same is inserted into the brew funnel 10". Filter pack 14', having filter receiving means 40" may be aligned with key means 38" to rest on elevation device 26" so that beverage can be brewed after the brew funnel 10" is mounted or placed on a beverage brewing apparatus as shown in FIG. 6.

It is particularly noted herein that the illustrative brew funnels shown in FIGS. 3 and 5 do not have siphon arrangement 50' and 50" extending or protruding above elevation device (i.e., 26' and 26") as is optionally illustrative for the brew funnel depicted in FIGS. 1 and 2. It, should also be understood that siphon arrangements are generally preferred in the brew funnels used in this invention, but they are not mandatory.

Figure 6:
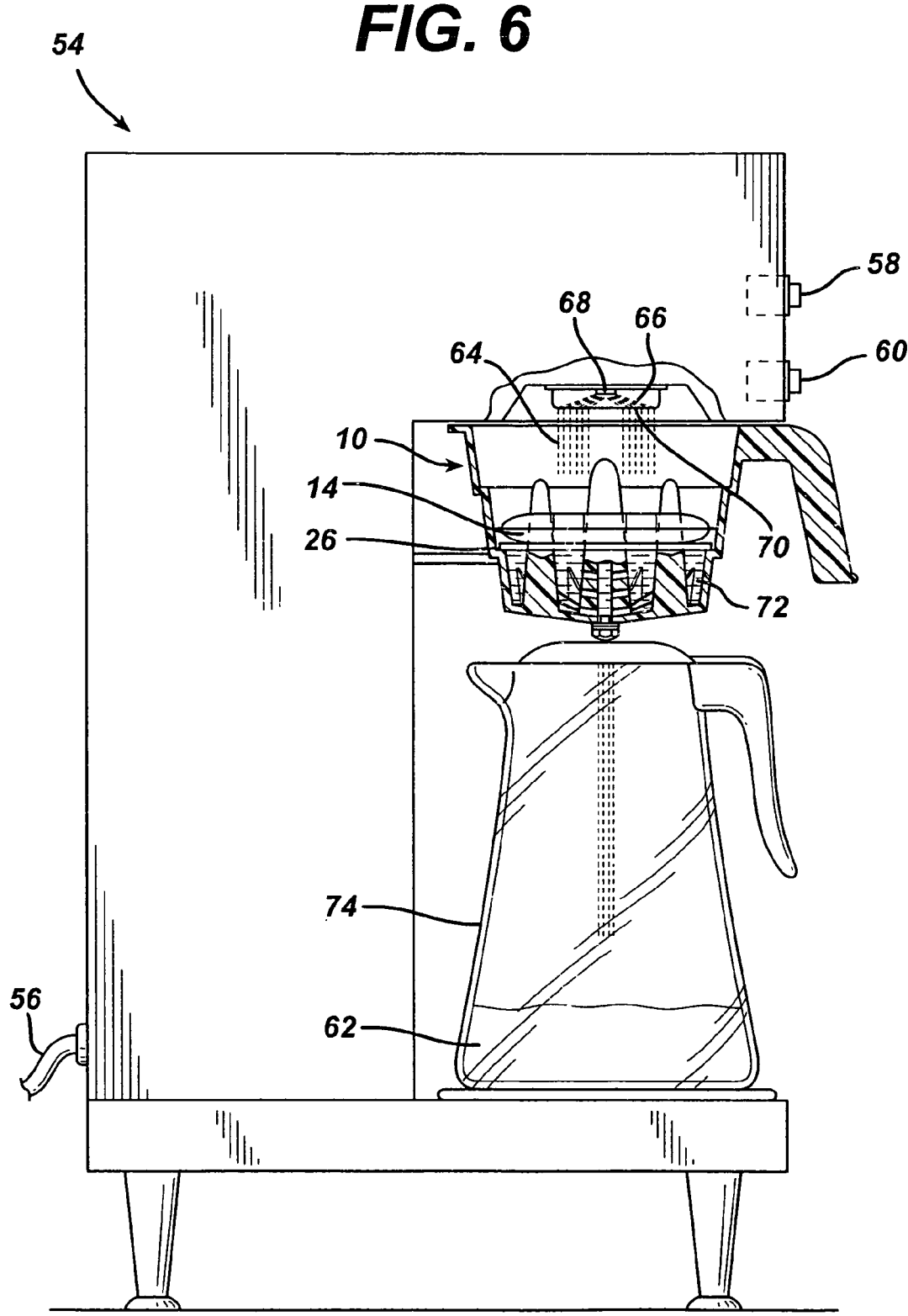
FIG. 6 depicts a side view of the beverage brewing apparatus of this invention.

Turning to FIG. 6, a side view of an illustrative beverage brewing apparatus 54 of this invention is shown. The beverage brewing apparatus 54 has a water supply (not shown) and electrical supply 56. Power switch 58 allows for power to be supplied to the brewing apparatus 54 and brew switch 60 allows for and initiates the brewing of ready for drinking beverage 62. Illustrated in FIG. 6 is brew funnel 10 supported in beverage brewing apparatus 54 by guides (not shown) operatively associated with brew funnel lip 24. Elevation device 26 is placed within brew funnel 10 as is filter pack 14, extending through both is key means 38. Water 64 is dispensed from dispensing outlet 66 having a water outlet 68 and water holes 70 that direct the water 64 filter pack 14 (with beverage precursor therein) placed on elevation device 26. Pasteurizing beverage (for example) 72, when, tea, can remain in brew funnel 10 not longer than about 10 minutes, preferably, not longer than about 7 minutes, and most preferably, not longer than about 5 minutes before draining through exit pore 52 as ready for drinking tea 62 in to receiving vessel 74.

In operation, (when making tea as described herein) it is particularly noted that when cold brew tea is preferred, the tea leaf employed is typically enzyme treated. Also, from about 50% to about 75% of the total weight of water within the ready to drink tea is added after brewing. When cold brewing tea, typically from about 0.75 ounces to about 1.5 ounces of tea leaf is used for about every 1.0 gallon of tea brewed. When hot brewing tea, typically from about 0.5 ounces to about 1.25 ounces of tea leaf is used for about every 1.0 gallon of tea brewed.

When making coffee, conventional conditions are used and they are similar to the conditions for making tea except that the beverage precursor is, for example, ground coffee comprising and not tea leaf comprising. Thus, when making coffee, the temperature of the water and the amount of ground coffee used is comparable to the conditions found in conventional coffee brewing apparatuses, like the Black & Decker® SmartBrew™.

When purchasing the brewing apparatus of this invention, the brewing apparatus may be sold with filter packs having beverage precursor therein. Such a brewing apparatus is provided with instructions that indicate that the superior brewing apparatus of this invention (e.g, a beverage brewing apparatus with a brew funnel having an elevation device and key means as described herein) can only be used to brew superior tasting beverage of a single brand, whereby the brand of beverage brewed must match the name of the brand of beverage displayed on the beverage brewing apparatus.

Therefore, the filter packs employed should fit (like a lock and key) on the key means, and rest flatly on the elevation device to ensure that each consumer or end user is only obtaining a desired beverage and not subject to consumer confusion, intentional or not.

What is claimed is:

1. A method for brewing a beverage comprising the steps of:
   (a) inserting a filter pack comprising a beverage precursor in to a brew funnel of a beverage brewing apparatus and aligning a filter receiving means of the filter pack onto key means within the brew funnel; and
   (b) subjecting the filter pack to water
   wherein no key means pierces or perforates the filter pack and further wherein said key means is an interlocking or lock and key fitting which enables the brew funnel to accept one brand of a filter pack with said beverage precursor packed therein.

2. A method for brewing a beverage according to claim 1 wherein the beverage precursor is a coffee precursor or a tea precursor.

3. A method for brewing a beverage according to claim 1 wherein the beverage brewing apparatus displays a brand, and the filter pack is suitable to brew a brand of beverage that matches the brand displayed on the beverage brewing apparatus.

4. The method of claim 1 wherein the filter pack rests on an elevation device within the brew funnel.

5. The method of claim 1 wherein the key means is mounted on the elevation device.

6. The method of claim 1 wherein the key means is mounted on the brew funnel.

* * * * *